United States Patent [19]

Tao

[11] Patent Number: 5,555,491
[45] Date of Patent: Sep. 10, 1996

[54] COMPACT DOCKING STATION FOR PORTABLE COMPUTER

[75] Inventor: Adam M. Tao, Laguna Niguel, Calif.

[73] Assignee: Toshiba America Information Systems, Inc., Irvine, Calif.

[21] Appl. No.: 388,579

[22] Filed: Feb. 14, 1995

[51] Int. Cl.⁶ .............................. H05K 7/10; G06F 1/16
[52] U.S. Cl. .......................... 361/686; 361/683; 248/923; 248/185.1
[58] Field of Search .................... 361/680–686, 361/724–727; 364/708.1; 312/223.1, 223.2, 223.3; 248/371, 923, 919, 185.1, 183.2; G06F 1/16

[56] References Cited

U.S. PATENT DOCUMENTS

| | | | |
|---|---|---|---|
| D. 364,853 | 12/1995 | Ojeda | D14/107 |
| 5,030,128 | 7/1991 | Herron et al. | 361/683 |
| 5,182,698 | 1/1993 | Kobayashi et al. | 361/740 |
| 5,187,645 | 2/1993 | Spalding et al. | 361/686 |
| 5,310,358 | 5/1994 | Johnson et al. | 361/686 |
| 5,460,547 | 10/1995 | Belt et al. | 439/638 |

*Primary Examiner*—Leo P. Picard
*Assistant Examiner*—Lynn D. Hendrickson
*Attorney, Agent, or Firm*—Banner & Allegretti, Ltd.

[57] ABSTRACT

A compact docking station for a portable computer includes a mounting bracket assembly for supporting together as a compact unit a computer port replicating device, a DC power supply and a light for illuminating the work area of the computer. The mounting bracket assembly includes lower and upper mounting brackets that are pivotably connected to each other. The lower mounting bracket can be directly mounted on a support base such as a vehicle console. The upper mounting bracket provides a computer support surface and carries the port replicating device adjacent thereto. The upper mounting bracket is pivotable between a generally horizontal computer use position, and an upwardly angled computer removal/attachment position. This arrangement allows the computer to be positioned for use in a limited space, with minimal handling and clutter.

22 Claims, 9 Drawing Sheets

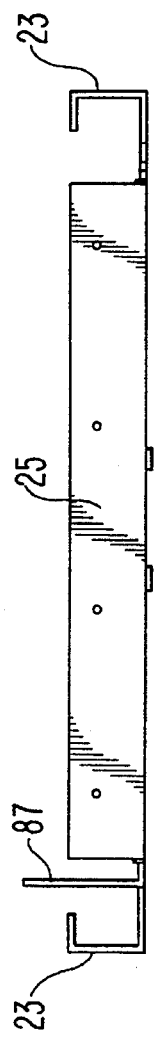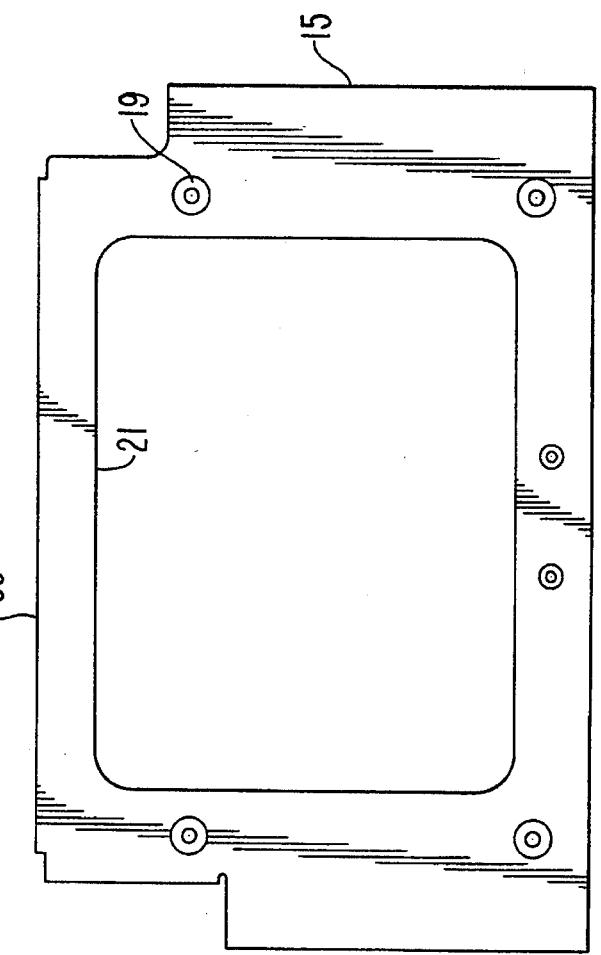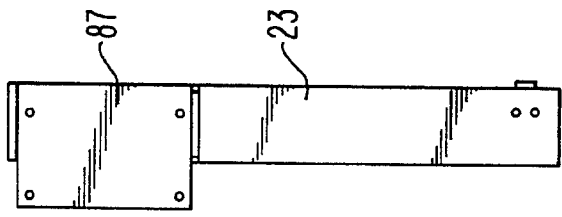

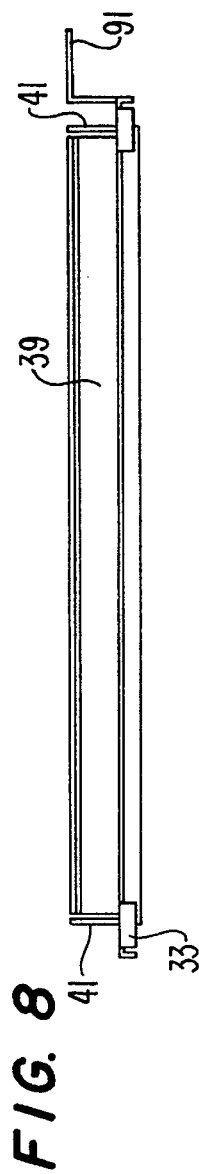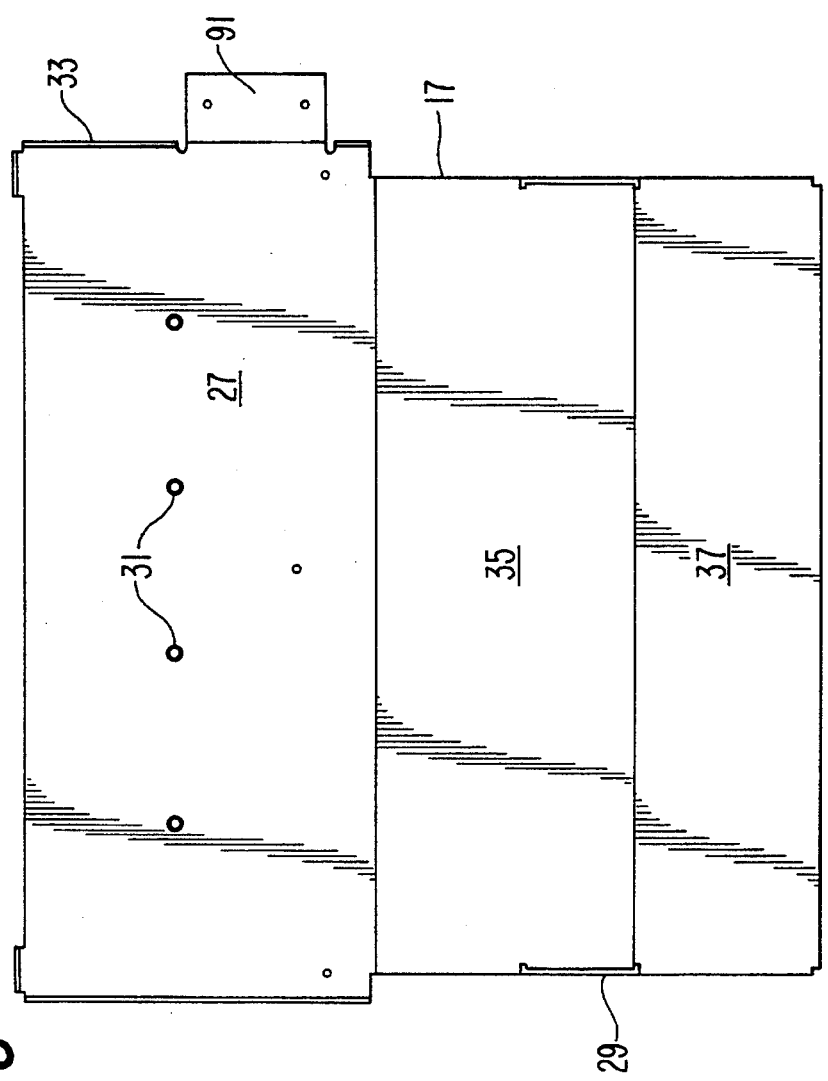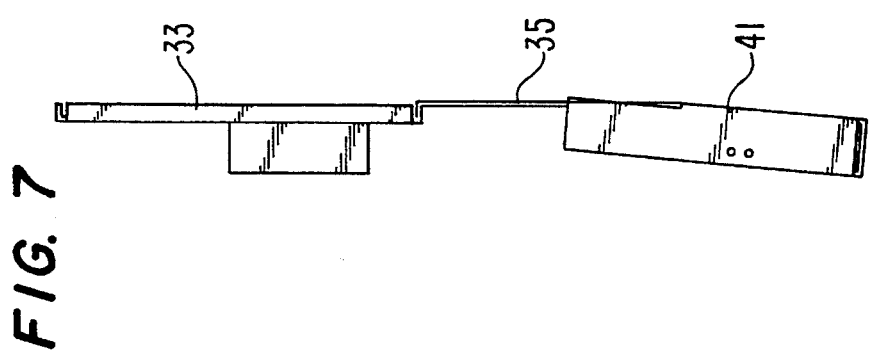

COMPACT DOCKING STATION FOR PORTABLE COMPUTER

BACKGROUND OF THE INVENTION

This invention pertains to a support device used to support a computer for use in a confined space, such as inside a vehicle, and more specifically to a compact computer docking station including a mounting bracket assembly and a computer port replication device.

Recently, with the advent of lightweight portable computers, e.g., laptop and notebook computers, individuals who must travel extensively and those who work largely out of their automobiles, such as law enforcement personnel and sales people, have access to full powered computers in their vehicles. While the advantages of mobile computer use are manifest, there are specific problems presented by introducing a computer into a vehicular environment: (i) physical mounting and support difficulties, (ii) space limitations, (iii) power conversion problems arising from use of a vehicle battery as a power source, (iv) linking the computer to peripheral devices such as a cellular modem, and (v) retaining full portability of the computer for flexibility of use and prevention of theft.

A variety of prior art devices attempt to address the problem of adequate support for a computer in a vehicle by providing specially designed mounting devices for vehicles.

U.S. Pat. No. 4,854,538 to Von Schalscha discloses an appliance mounting device for a motor vehicle having fin-like stabilizing elements to be positioned over a drive shaft tunnel on the floor of a motor vehicle. The stabilizing elements form a base which supports a series of articulated members ultimately providing an upper tray for holding an appliance such as a computer. As can be appreciated, this type of mounting device occupies valuable space in the limited confines of a motor vehicle, and must be mounted over the drive shaft tunnel which may not be possible in some vehicles, particularly if the vehicle is outfitted with a center console.

U.S. Pat. No. 4,946,120 to Hatcher discloses a support for a portable computer which rests on a car seat. The support has a lower unit with adjustable legs and an upper unit which is mounted to the lower unit by a swivel connection. Nylon straps are provided for securing the computer to the upper unit. This table-top sort of support device occupies too much valuable space in a motor vehicle by taking away a passenger seating area when in use.

The patents to Von Schalscha and Hatcher also do not provide for any integrated electrical connections so that a computer would have various cables running from it to a power source and any peripheral devices. Besides cluttering the already limited space within the vehicle, the myriad of necessary electrical connections and wires limits the portability of the computer, as a user cannot easily disconnect the computer.

U.S. Pat. No. 5,177,665 to Frank et al. attempts to simplify the electrical connections between the computer, its power source and any peripheral devices, by providing a housing which includes a built-in connector. The housing comprises a lower support for receiving the computer, and an upper lid which is movable between open and closed positions. The upper lid of the housing includes hooks which are used to hook the housing to the steering wheel of a vehicle. In the mounted position, the upper lid rests against the steering wheel while the lower support presents a horizontal surface for the computer. A major shortcoming of this device is that the support is usable only when the vehicle is stationary. It obviously cannot be left attached to the steering wheel when the vehicle is in motion.

SUMMARY OF THE INVENTION

In view of the foregoing, it is a principal object of the present invention to provide a support device that allows a portable computer to be securely supported for use within a restricted space, and which is manipulable to allow for easy engagement/disengagement of the computer from the support device.

It is a further object of the present invention to provide a support device usable with a computer port replicator to provide a compact computer docking station that enhances computer portability through the use of integrated electrical connections.

Still another object of the present invention is to provide a compact computer support device that is inexpensive to manufacture, and simple and reliable in use.

Yet another object of the present invention is to provide a support device which is easy to install on a base such as a vehicle console.

A still further object of the present invention is to provide a support device for supporting as a unit a power supply and computer peripheral devices, in addition to a computer and port replicator.

Another object of the present invention is to provide a compact computer docking station including a light source for illuminating the computer work area.

The above and other objects are achieved by the various aspects of the present invention, as summarized below.

In one aspect of the present invention, a docking station is provided for a portable computer. A lower mounting bracket includes attachment means for attaching the mounting bracket to a base. An upper mounting bracket provides a generally planar computer support surface for removably supporting a portable computer. The upper mounting bracket is pivotably connected to the lower mounting bracket, whereby the upper mounting bracket can be moved between a computer use position wherein said support surface extends generally parallel and adjacent to the lower mounting bracket, and a computer attachment/removal position wherein the support surface extends upwardly away from the lower mounting bracket.

The docking station further includes a computer port replicating device attached to the upper mounting bracket adjacent the computer support surface. The port replicating device has power input means for receiving power from a power supply, at least one data input/output port, and connector means for electrically connecting the portable computer with the power input means and the at least one data input/output port. The connector means is engageable with mating connector means provided on the portable computer by positioning the portable computer on the computer support surface and moving the computer against the port replicating device, and disengageable from the mating connector means by moving the computer away from the port replicating device.

In another aspect of the present invention, a mounting bracket assembly is provided for removably supporting a portable computer in a confined space. A lower mounting bracket has mounting means for mounting the bracket assembly to a base. An upper mounting bracket provides a generally planar computer support surface for removably supporting a portable computer. The upper mounting bracket is pivotably connected to the lower mounting bracket, whereby the upper mounting bracket can be moved between a computer use position wherein the support surface extends generally parallel and adjacent to the lower mounting bracket, and a computer attachment/removal position wherein the support surface extends upwardly away from said lower mounting bracket.

The mounting bracket assembly further includes a clip for removably securing the computer to the upper mounting bracket and releasably maintaining the upper mounting bracket in the computer use position. The clip comprises a lower arm portion attached to the lower mounting bracket and an upper arm portion extending above the upper mounting bracket for engagement with a computer positioned on the computer support surface.

In yet another aspect of the invention, a docking station for a portable computer is provided. A bracket assembly thereof includes attachment means for attaching the bracket assembly to a base, and a generally planar computer support surface for removably supporting a portable computer. A computer port replicating device is attached to the bracket assembly adjacent the computer support surface. The port replicating device has power input means for receiving power from a power supply, at least one data input/output port, and connector means for electrically connecting the portable computer with the power input means and the at least one data input/output port. The connector means is engageable with mating connector means provided on the portable computer, by positioning the portable computer on the computer support surface and moving the computer against the port replicating device, and disengageable from the mating connector means by moving the computer away from the port replicating device. A DC power supply is attached to the bracket assembly for providing power to the port replicating device; and an electric light assembly is attached to the bracket assembly for illuminating the work area of a portable computer supported on the computer support surface.

While the docking station of the present invention can be used in any location where computer use is desired, it is particularly suited for use in vehicles and other confined environments demanding a high degree of compactness, easy computer accessibility, and minimal clutter. The above and other objects, features and advantages of the invention will be fully appreciated and understood from the following detailed description of the preferred embodiments of the invention, with reference to the accompanying drawings.

BRIEF DESCRIPTION OF THE DRAWINGS

FIG. 3 is a top plan view of a lower mounting bracket of the bracket assembly shown in FIG. 2.

FIG. 4 is a side elevational view of the lower mounting bracket shown in FIG. 3.

FIG. 5 is a front elevational view of the lower mounting bracket shown in FIG. 3.

FIG. 6 is a top plan view of an upper mounting bracket of the bracket assembly shown in FIG. 2.

FIG. 7 is a side elevational view of the upper mounting bracket shown in FIG. 6.

FIG. 8 is a front elevational view of the upper mounting bracket shown in FIG. 6.

DETAILED DESCRIPTION OF THE PREFERRED EMBODIMENTS

Figure 1:
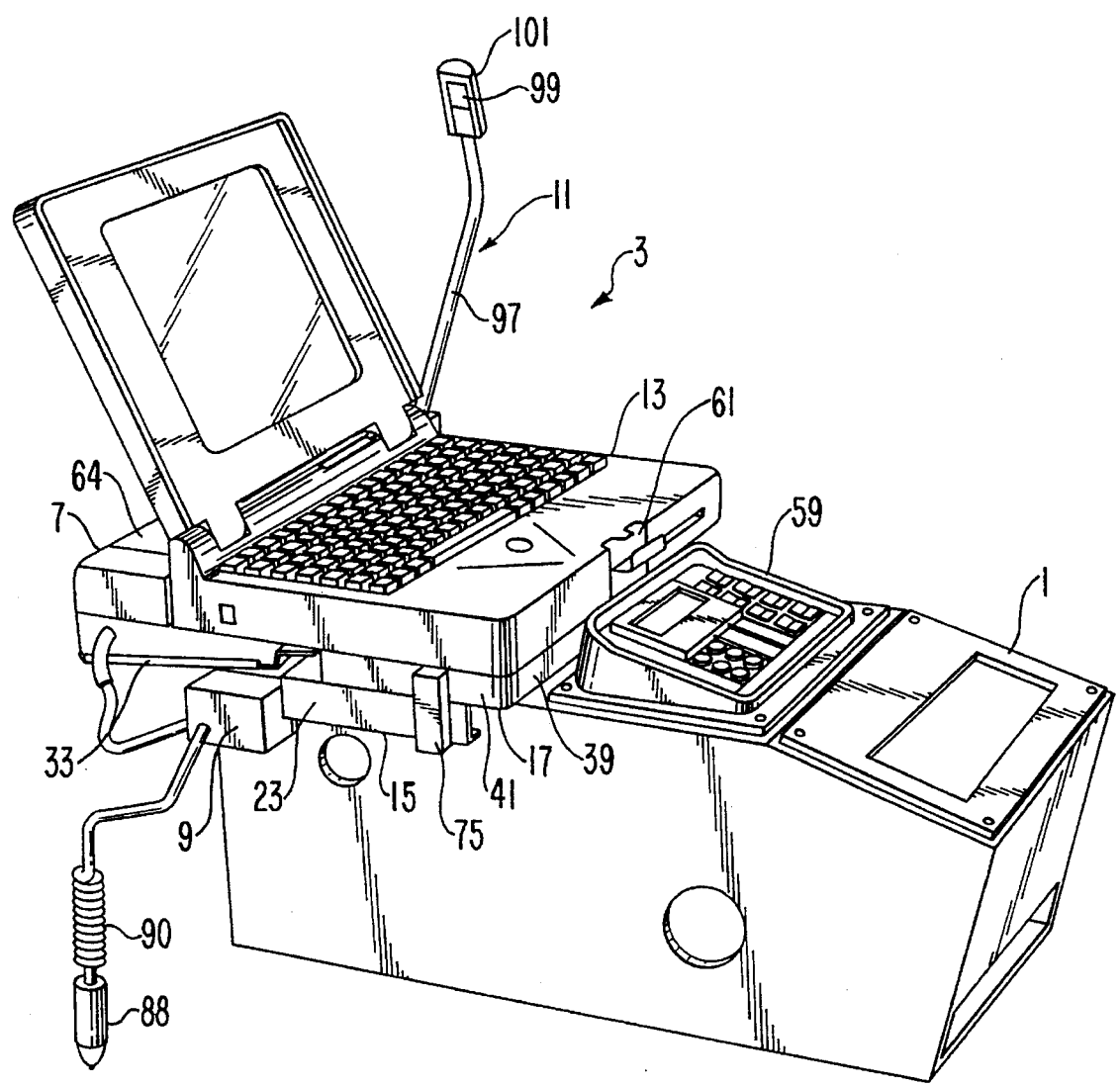
FIG. 1 is a perspective view of a compact computer docking station in accordance with the present invention, shown mounted on a vehicle console and with a computer docked therein and positioned for use.
Figure 2:
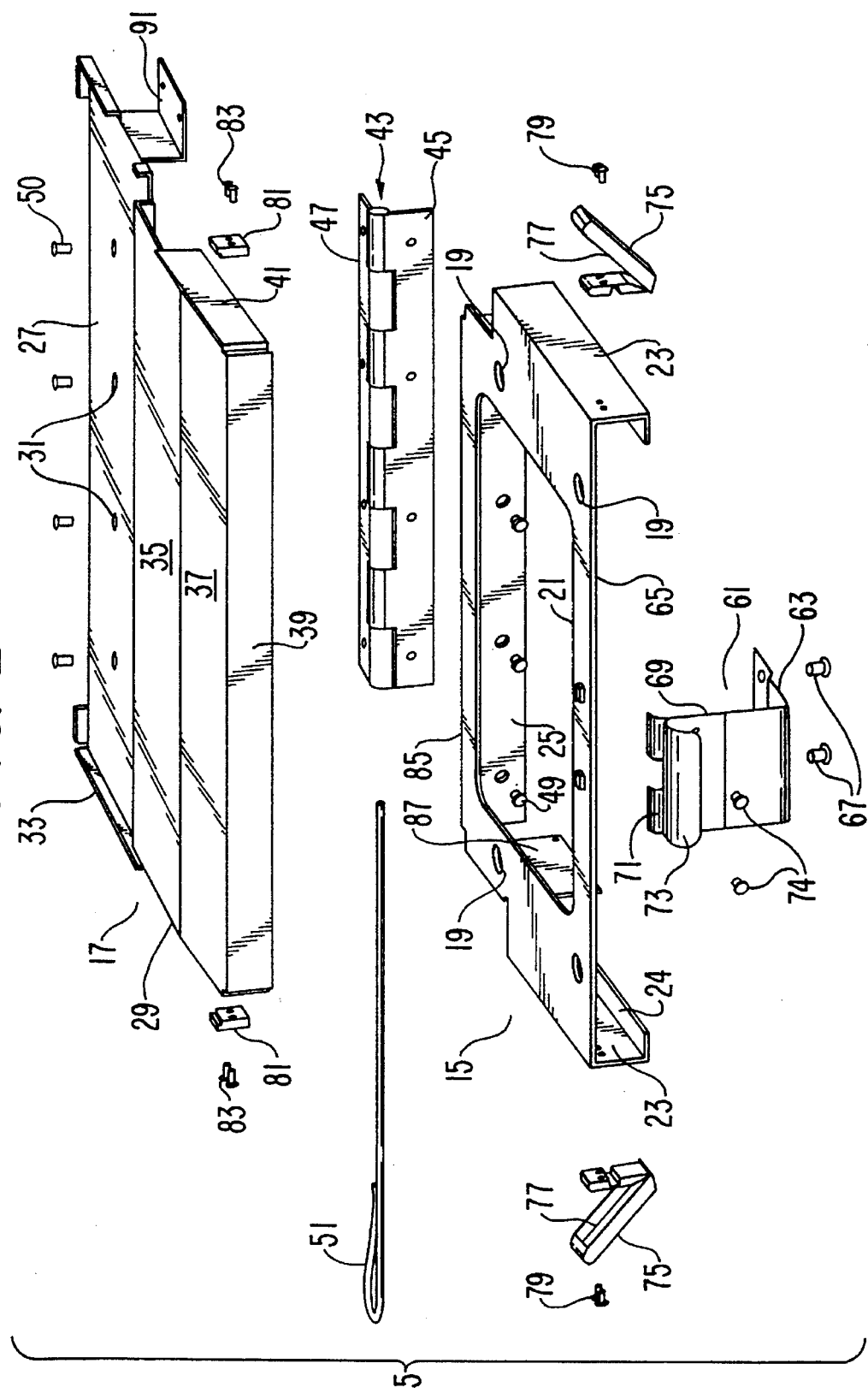
FIG. 2 is an exploded perspective view of a mounting bracket assembly of the docking station illustrated in FIG. 1.

Referring first to FIGS. 1 and 9–11, utilization of the present invention in an exemplary vehicle mount is illustrated. In various vehicles, such as automobiles used by law enforcement personnel, a front center console 1 is provided primarily for housing communication equipment. A docking station 3 in accordance with the present invention is particularly suited for mounting onto such a center console. A significant amount of the limited space within the vehicle is already utilized by center console 1. Advantageously, docking station 3 takes up a minimum of additional space by being flat-mounted thereto.

Docking station 3 principally comprises a mounting bracket assembly 5 for carrying together (as a unit) a computer port replicating device 7, a DC power source (adapter) 9, and an electric light assembly 11. Docking station 3 enables a user to simply "dock" a portable computer 13 by engaging it with port replicating device 7 and securing it to bracket assembly 5, as will be described. The present invention can be used to support a variety of computer/port replicator combinations, simply by making suitable adjustments to the size and shape of the bracket assembly components. The illustrated embodiment is specifically configured for use in supporting the Toshiba T2400CT notebook computer, and its compatible port replicator.

Figure 9:
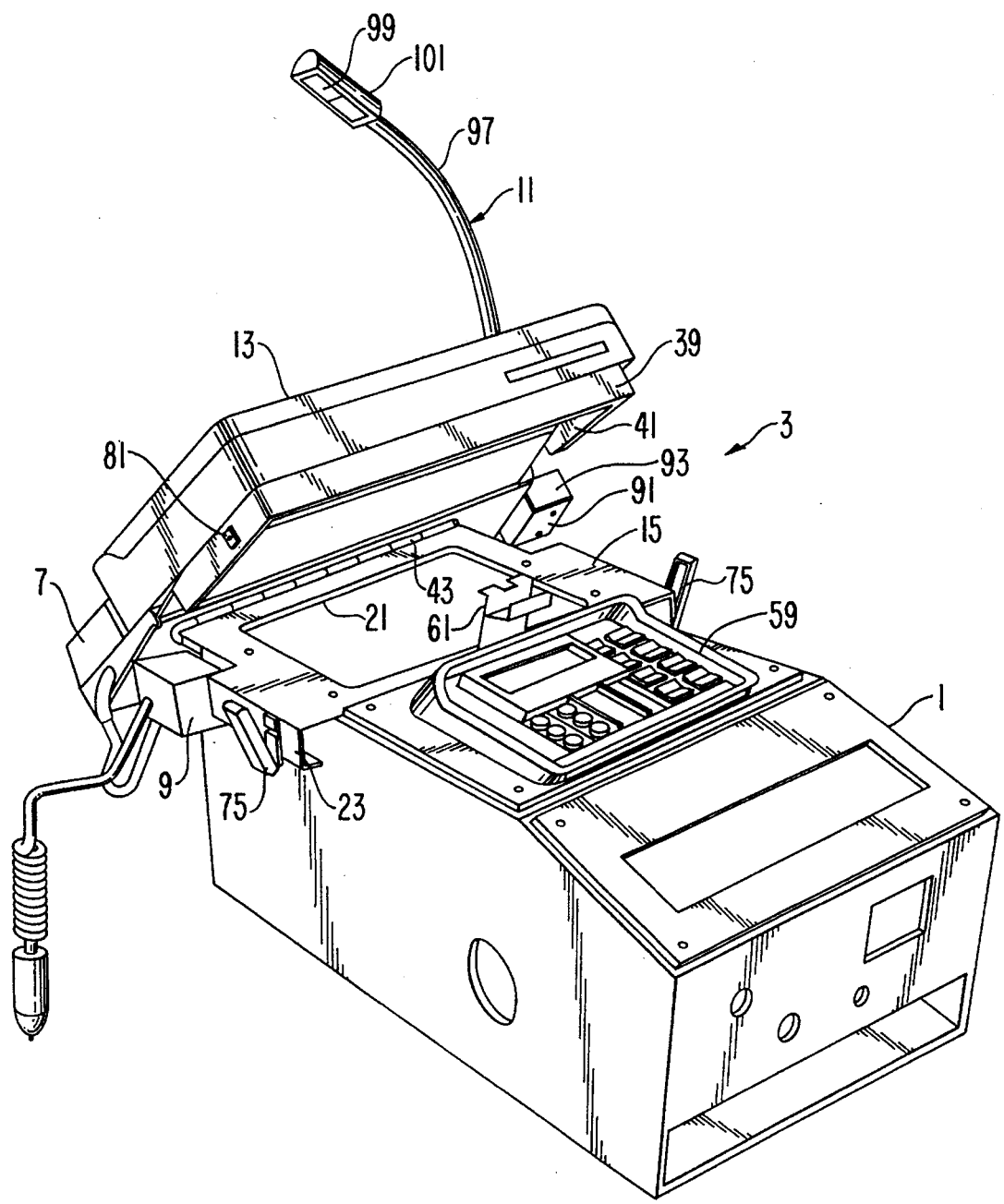
FIG. 9 is a perspective view similar to FIG. 1, showing the upper mounting bracket pivoted upwardly with respect to the lower mounting bracket, and the computer still engaged with its port replicator.

As seen most clearly in FIGS. 2–8, mounting bracket assembly 5 comprises two main pivotably connected elements: lower mounting bracket 15 and upper mounting bracket 17. Lower mounting bracket 15 is adapted to be mounted directly on center console 1. As best seen in FIG. 9, lower mounting bracket 15 includes mounting holes 19 for bolting lower bracket 15 to console 1. An aperture 21 is formed by the frame-like construction of lower mounting bracket 15. This facilitates access to center console 1, and the components mounted therein. The edges of lower bracket 15 are preferably bent downwardly to form shallow side panels 23 finished with an under-flange 24, and a shallow front panel 25.

Upper mounting bracket 17 is generally planar and significantly longer than lower bracket 15 in the front-to-rear direction. (Herein, references to the "front" and "rear" in connection with descriptions of docking station 3 refer to the sides oriented toward the front and rear sides of a vehicle in which the device can be mounted, respectively.) As best seen in FIGS. 6–8, upper bracket 17 includes a front portion 27 and a rear portion 29. Front portion 27 provides a support surface configured to receive thereon computer port replicator 7, and includes mounting holes 31 for mounting the port replicator with bolts or other conventional fasteners. To assist with the proper positioning of port replicator 7 during assembly, an upturned lip 33 is provided at the sides and part-way along the front edge of front portion 27. Rear portion 29 is stepped up slightly from front portion 27, and is configured to provide a support surface for receiving thereon computer 13. Rear portion 29 comprises two planar surfaces 35, 37 that are angled slightly relative to one another. Rolled or bent edges provide rear portion 29 with a boxed rear edge 39 and shallow side panels 41.

Mounting brackets 15 and 17 can be formed using conventional forming processes and materials, e.g., by stamping sheet metal. Rolling and bending processes can be used to form the various support surfaces, side panels, and flanges. Of course, a variety of other suitable materials and forming methods may Lower mounting bracket 15 and upper mounting bracket 17 are pivotably connected together by a piano-type hinge 43 having a lower hinge member 45 and a separable upper hinge member 47. Lower hinge member 45 is affixed to shallow front panel 25 of lower bracket 15, such as by rivets 49. Upper hinge member 47 is affixed to the bottom surface of upper bracket 17, such as by rivets 50. A removable hinge pin 51 connects lower hinge member 45 to upper hinge member 47. Separation of the lower and upper mounting brackets 15, 17, by removal of hinge pin 51, facilitates the mounting of lower bracket 15 onto console 1. In addition, this arrangement allows upper mounting bracket 17 to be easily removed for servicing or replacement of port replicator 7 (which is affixed to upper bracket 17).

In docking station 3, the computer peripheral devices and power source are not connected directly to computer 13. Pather, these devices are connected to port replicating device 7, via its ports 53 (see FIG. 11). In the illustrated embodiment, port replicating device 7 duplicates exactly the ports on the back of computer 13. Computer port replicating device 7 includes a single rear side connector 55 (see FIG. 10) for engagement with a mating connector provided on the back of computer 13. In this manner, all of the cabling is achieved through port replicating device 7, and computer 13 need only be engaged with the port replicating device to be fully operational.

Tight engagement of port replicator 7 and computer 13 is assured by a latching mechanism on the port replicatot 7. The latching mechanism includes tabs 62 that engage with the bottom of computer 13. Tabs 62 are linked to top side latch handle 64 so that as handle 64 is depressed from the upstanding position shown in FIG. 10, to the flush position shown in FIGS. 1 and 11, tabs 62 move forwardly thereby pulling the mating connectors of computer 13 and port replicator 7 into tight engagement with each other. Computer 13 is securely locked in engagement with port replicator 7 until handle 64 is moved back to its upstanding position. This arrangement allows computer 13 to be easily and securely attached to docking station 3, and easily removed therefrom when it is to be stowed or used in other locations.

Figure 10:
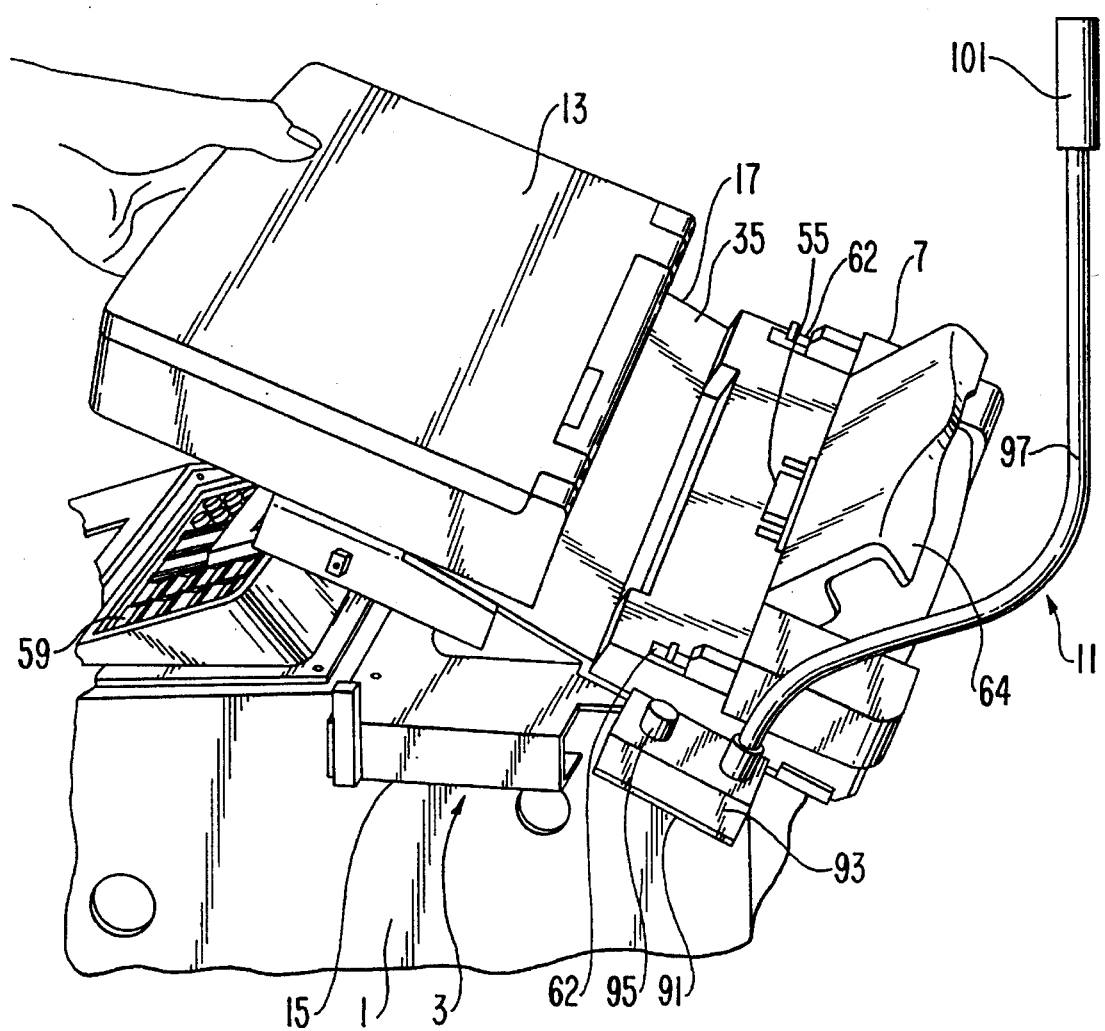
FIG. 10 is a perspective view of the docking station, computer and console combination of FIG. 1, showing the upper mounting bracket pivoted upwardly, as in FIG. 9, but with the computer shown detached from its port replicator.
Figure 11:
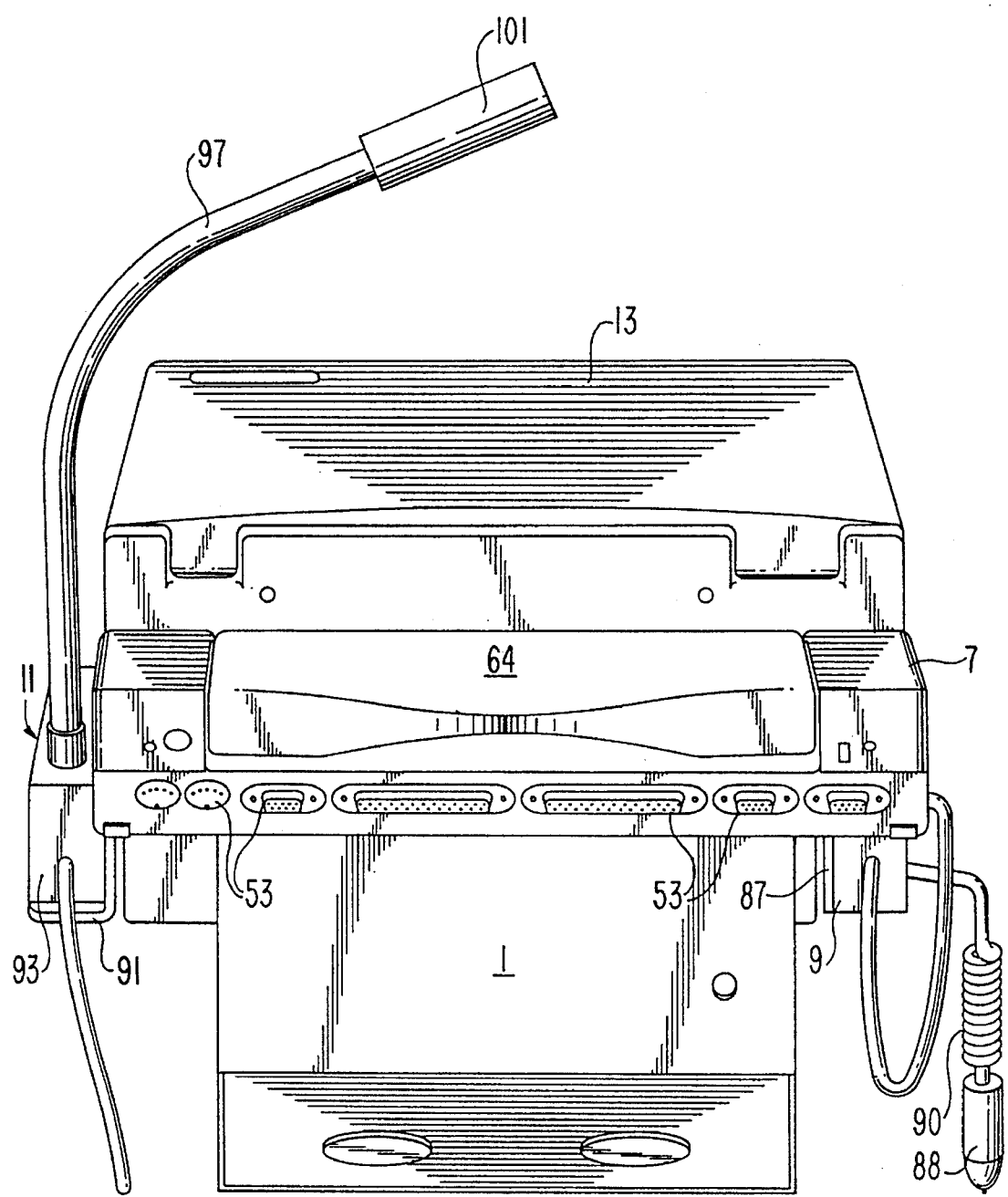
FIG. 11 is a rearside perspective view of the docking station, computer and console combination of FIG. 1, showing the computer screen in the closed position.

The pivotable connection between lower and upper brackets 15, 17 advantageously enables computer 13 to be fit within a confined space. For example, as seen in FIGS. 1 and 9–10, console 1 has a radio 59 protruding upwardly therefrom. This severely limits access to the space in front of radio 59. By virtue of the pivotal connection between mounting brackets 15 and 17, computer 13 can be mounted in this small space.

Conventionally, computer 13 and port replicator 7 are aligned in a horizontal orientation for engagement with each other. This approach is not possible in the illustrated vehicular environment due to the presence of radio 59. In accordance with the present invention, port replicator 7 can be angled upwardly by pivoting upper bracket 15 on lower bracket 17. With port replicator 7 in this orientation, computer 13 can be positioned on the computer support surface formed by upper bracket rear portion 29 and moved into engagement with port replicator 7. Thereafter, upper mounting bracket 17 is allowed to pivot back down against lower bracket 15 to position computer 13 in a substantially horizontal computer use position. Likewise, with upper bracket 17 tilted upwardly in the aforementioned manner, computer 13 can be easily grasped and removed, as seen in FIG. 10.

When lower and upper mounting brackets 15, 17 are attached to each other, a front side edge portion of upper mounting bracket 17 (a forward part of front portion 27) overhangs a front side edge of lower mounting bracket 15. Hinge 43 is mounted to the bottom surface of upper mounting bracket 17 adjacent to the front side edge portion. Advantageously, with this arrangement port replicator 7 is lowered as upper mounting bracket 17 is pivoted upwardly, thereby providing additional clearance above port replicator 7 for operation of latch handle 64. This is particularly important when docking station 3 is mounted at the forward end of a vehicle console, where the vehicle dashboard or another obstruction would otherwise make operation of latch handle 64 difficult or impossible. This arrangement also advantageously shortens the radius of the pivot arc of upper mounting bracket 17, whereby a greater degree of tilt can be obtained for a given vertical displacement of upper bracket rear edge 39.

When computer 13 is "docked" in docking station 3, it is held securely on upper mounting bracket 17 by a resilient generally L-shaped spring clip 61. Spring clip 61 comprises a lower horizontally extending arm portion 63 affixed to lower bracket 15, at its rearward edge 65 (such as by rivets 67), and an upper vertical arm portion 69 extending above upper mounting bracket 17. Upper arm portion 69 has a forwardly (inwardly) directed flange 71 at its free end. Flange 71 is biased forwardly to a computer engagement position overlapping upper mounting bracket 17. A handle tab 73 is attached to clip 61, such as by rivets 74, adjacent to flange 71. In order to remove computer 13, spring clip 61 is displaced, e.g., pulled rearwardly (outwardly) from the computer engagement position to release computer 13. This also frees upper mounting bracket 17 to be pivoted upwardly to the computer attachment/removal position.

In the computer use position, lower bracket 15 and upper bracket 17 are substantially parallel and adjacent to one another, with side panels 41 resting upon lower bracket 15. Auxiliary latches 75 can be provided for tightly latching upper bracket 17 to lower bracket 15, in order to firmly hold upper bracket 17 in the computer use position. Each latch 75 comprises a resilient clasp 77 attached to side panel 23 of lower bracket 15, such as by rivets 79, and mating plastic lugs 81 attached to a respective panel 41 of upper bracket 17, such as by rivets 83. A suitable resilient plastic latch is available from SouthCo Company of Lester, Pa.

The preferred embodiment of docking station 3 also includes a DC power source (adapter) 9 for providing conditioned power to computer port replicator 7 and computer 13. In the illustrated embodiment, adapter 9 is mounted to a vertical support surface 87 of lower mounting bracket 15. Support surface 87 is located adjacent to front edge 85 of lower bracket 15 for proximity to a vehicle's cigarette lighter outlet or other electrical connection. Adapters suitable for use with the illustrated Toshiba T2400CT laptop computer (and its compatible port replicator) are manufactured as Model Nos. DCA1805 and DCA2400C by Xtend Micro Products, Inc. of Irvine, Calif. These adapters convert the 10–16 DC voltage (20–50W) of a vehicle battery to an output voltage of 18 Volts DC ±5%, 2.5 A/20 W max, and provides reverse voltage, over voltage and over current protection.

While adapter 9 is shown with a cigarette lighter plug 88 and coiled cord 90, in certain applications it may be desirable to provide a standard straight cord and end connector for hard-wiring the adapter to a vehicle's electrical system. Additionally, to further reduce wiring clutter, the cord running from adapter 9 to port replicator 7 may comprise a detachable end plug having a 90° bend for directing the cord flatly along the side of port replicator 7.

Advantageously, docking station 3 also includes a light assembly 11 provided for illuminating the computer work area, i.e., the computer screen and keyboard. In the illustrated embodiment, a support surface in the form of an integral shelf 91 is provided off to the side of upper mounting bracket front portion 27. Light assembly 11 is affixed to shelf 91 with screws or other conventional fasteners. Light assembly 11 comprises a base 93, a rheostat type ON-OFF switch 95 on base 93, and a flexible gooseneck-type arm 97. Mounted at the free end of arm 97 is a lamp 99 and shield 101 therefor. Lamp 99 preferably comprises a known type of halogen bulb. Arm 97 can be adjusted to direct the light from lamp 99 as desired by the user, or to move light assembly 11 to an out-of-the-way position. Light assembly 11 is preferably detachably connected to the vehicle's electrical system. A light assembly suitable for use with the present invention is manufactured by Federal Signal Corp. of University Park, Ill. as model No. LF-CHP-M24.

Figure 12:
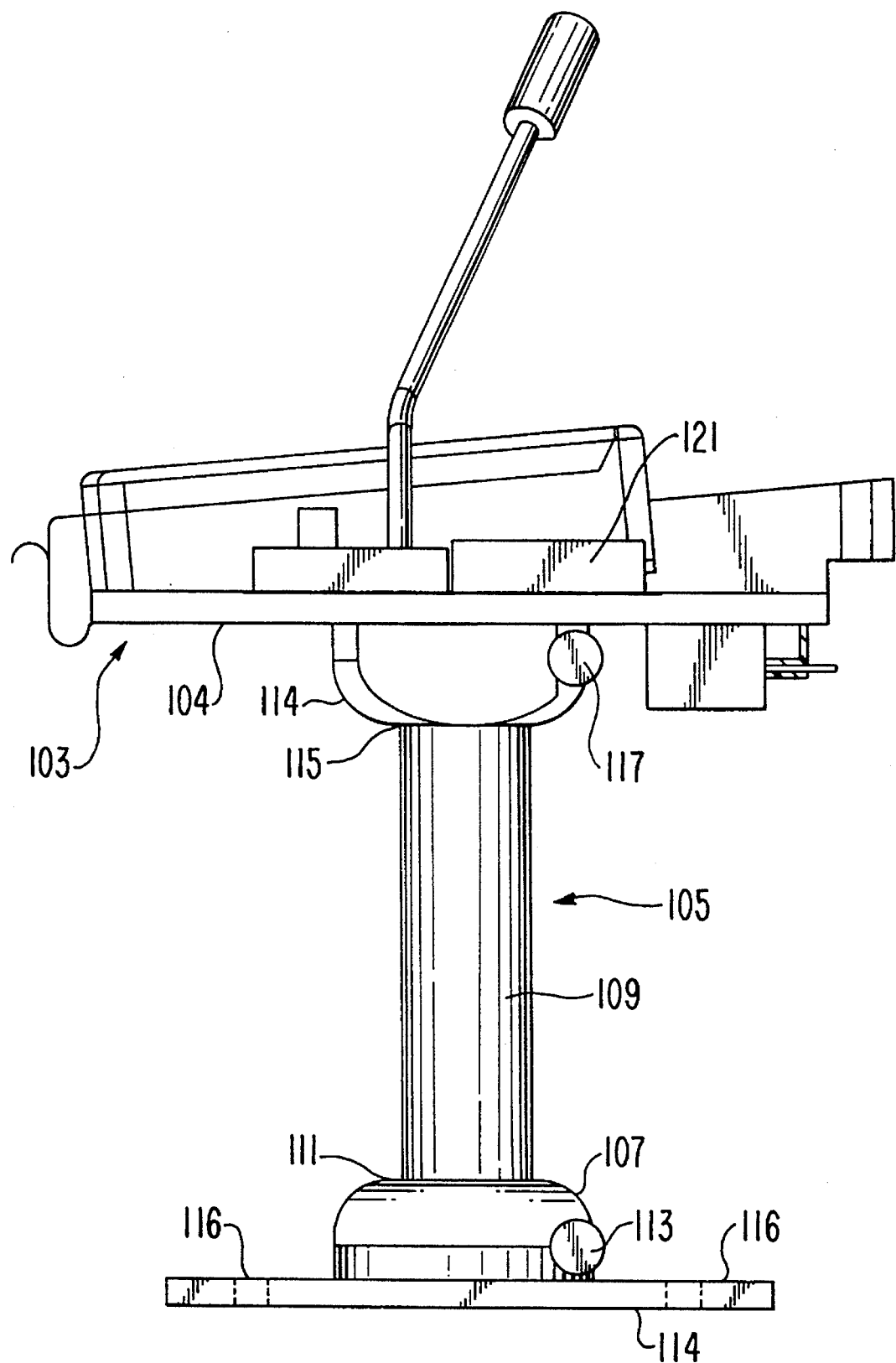
FIG. 12 is a perspective view of an alternative embodiment of the present invention, wherein the docking station is pivotally mounted on a pedestal and the mounting bracket assembly includes an additional support surface for supporting a computer peripheral device.
Figure 13:
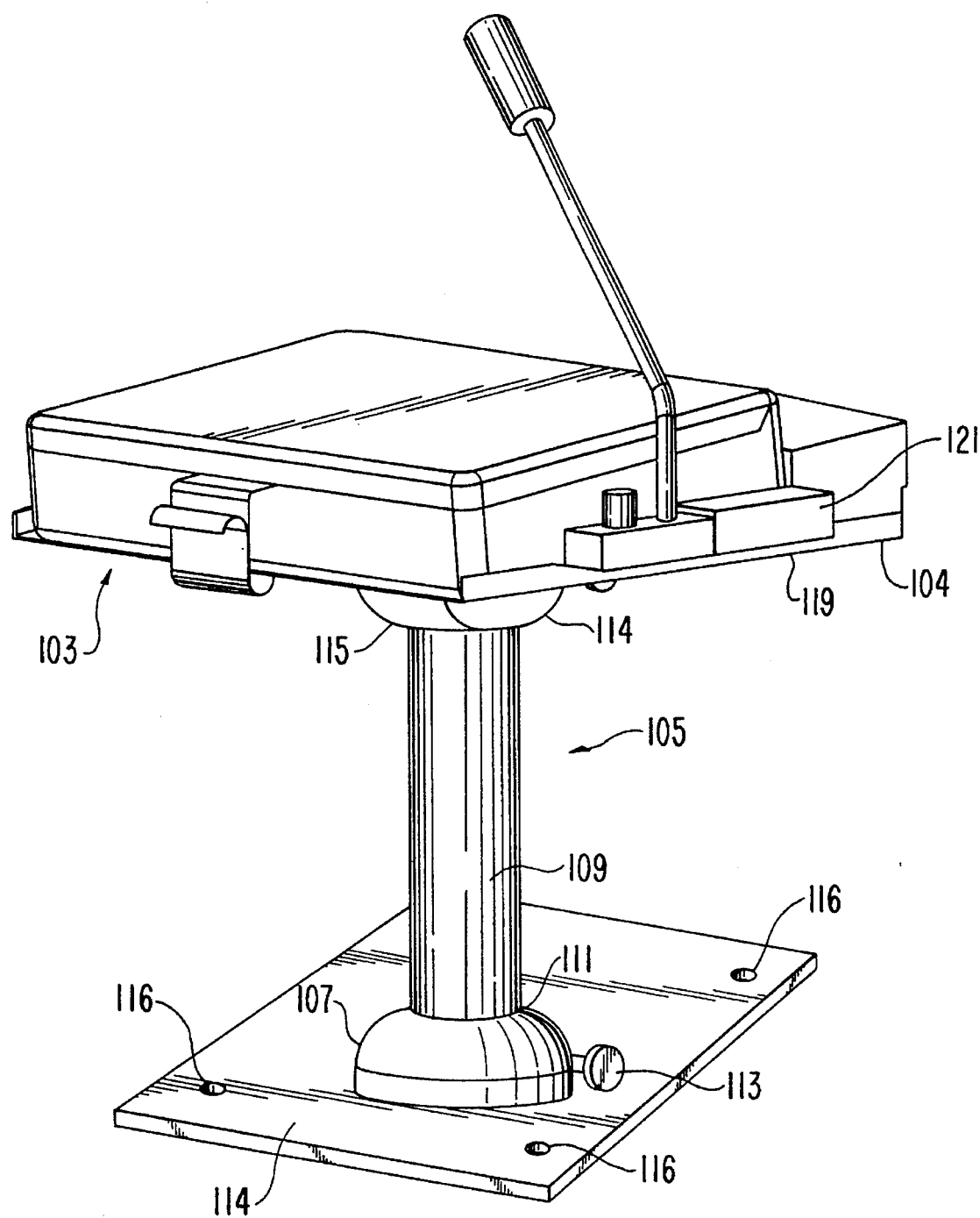
FIG. 13 is a side elevational view of the pedestal mounted docking station of FIG. 12.

A modified embodiment of the present invention is now described with reference to FIGS. 12 and 13. Whereas in the first embodiment, docking station 3 is mounted directly to vehicle console 1, in the modified embodiment, a docking station 103 comprises a bracket assembly 104 mounted on a pedestal structure 105. Pedestal structure 105 has a lower mounting base 107 for supporting a cylindrical support post 109. Base 107 has a ball and socket joint 111 equipped with a locking knob 113 for setting the azimuth and tilt of support post 109. Base 107 is mounted to a base plate 114 having mounting holes 116 for attaching base plate 114 to a support surface. Pedestal structure 105 also includes an upper base 114. Upper base 114 similarly has a ball and socket joint 115 and a locking knob 117, for setting the tilt angle of bracket assembly 104 relative to the pedestal. Pedestal structure 105 may be mounted to the floor of a vehicle passenger compartment, or to any other suitable supporting surface. The size and shape of base plate 114 can obviously be varied to accommodate different support surface configurations (including non-flat support surfaces). Moreover, the orientation of docking station 103 can be varied within a wide range. The flexibility of docking station 103 is thereby enhanced.

Additionally, bracket assembly 104 of the modified embodiment is configured somewhat differently from bracket assembly 5. In addition to means for securing bracket assembly 104 to upper base 114, bracket assembly 104 includes an additional support surface 119 for supporting an additional computer peripheral device 121. For example, peripheral device 121 could be a global positioning system (GPS) receiver, or a magnetic card reading device.

The invention has been described in terms of preferred and exemplary embodiments thereof. Other embodiments and modifications within the scope and spirit of the invention will occur to those having ordinary skill in the art. For example, the particular bracket configurations can be modified to accommodate differently shaped and sized computers, port replicating devices, power supplies and/or peripheral devices, and to allow mounting of the bracket assembly to various bases.

I claim:

1. A docking station for a portable computer, comprising:
   a lower mounting bracket including attachment means for attaching said mounting bracket to a base;
   an upper mounting bracket providing a generally planar computer support surface for removably supporting a portable computer, said upper mounting bracket being pivotably connected to said lower mounting bracket such that said upper mounting bracket is moveable between a computer use position wherein said support surface extends generally parallel and adjacent to said lower mounting bracket, and a computer attachment/removal position wherein said support surface extends upwardly away from said lower mounting bracket; and
   a computer port replicating device attached to said upper mounting bracket adjacent said computer support surface, said port replicating device having:
      power input means for receiving power from a power supply;
      at least one data input/output port; and
      connector means for electrically connecting the portable computer with said power input means and said at least one data input/output port, said connector means being engageable with mating connector means provided on the portable computer, by positioning the portable computer on the computer support surface and moving the computer against said port replicating device, and disengageable from the mating connector means by moving said computer away from said port replicating device.

2. A docking station according to claim 1 further comprising a DC power supply for supplying conditioned power to said port replicating device.

3. A docking station according to claim 2, wherein said DC power supply is attached to said lower mounting bracket.

4. A docking station according to claim 1, further comprising an electric light assembly for illuminating the work area of a portable computer supported on said computer support surface.

5. A docking station according to claim 4, wherein said light assembly is mounted to said upper mounting bracket.

6. A docking station according to claim 1, further comprising a clip for removably securing the computer to said upper mounting bracket and releasably maintaining said upper mounting bracket in said computer use position, said clip comprising a lower arm portion attached to said lower mounting bracket, and an upper arm portion extending above said upper mounting bracket for engagement with a computer positioned on said computer support surface.

7. A docking station according to claim 6, wherein said clip is a spring clip having at said upper arm portion an inwardly directed flange that is biased inwardly to a computer engagement position overhanging the upper mounting bracket, said flange being displaceable outwardly from said computer engagement position to release the computer and to allow the upper mounting bracket to be pivoted to the computer attachment/removal position.

8. A docking station according to claim 1, wherein a forward edge portion of said upper mounting bracket overhangs a forward edge of said lower mounting bracket, said forward edge of the lower mounting bracket being hinged to a bottom surface of said upper mounting bracket adjacent said forward edge portion of said overhanging portion.

9. A docking station according to claim 1, wherein said lower mounting bracket and said upper mounting bracket are hinged together with a removable hinge pin, whereby said lower and upper brackets are readily separable from each other.

10. A mounting bracket assembly for removably supporting a portable computer in a confined space, said bracket assembly comprising:

a lower mounting bracket having mounting means for mounting said bracket assembly to a base;

an upper mounting bracket providing a generally planar computer support surface for removably supporting a portable computer, said upper mounting bracket being pivotably connected to said lower mounting bracket such that said upper mounting bracket is moveable between a computer use position wherein said support surface extends generally parallel and adjacent to said lower mounting bracket, and a computer attachment/removal position wherein said support surface extends upwardly away from said lower mounting bracket; and a clip for removably securing the computer to said upper mounting bracket and releasably maintaining said upper mounting bracket in said computer use position, said clip comprising a lower arm portion attached to said lower mounting bracket and an upper arm portion extending above said upper mounting bracket for engagement with a computer positioned on said computer support surface.

11. A mounting bracket assembly according to claim 10, wherein said clip is a spring clip having at said upper arm portion an inwardly directed flange that is biased inwardly to a computer engagement position overhanging the upper mounting bracket, said flange being displaceable outwardly from said computer engagement position to release the computer and to allow the upper mounting bracket to be pivoted to the computer attachment/removal position.

12. A docking station according to claim 10, wherein said upper mounting bracket has a forward edge portion that overhangs a forward edge of said lower mounting bracket, said forward edge of the lower mounting bracket being hinged to a bottom surface of said upper mounting bracket adjacent said forward edge portion.

13. A mounting bracket assembly according to claim 10, wherein said lower bracket and said upper bracket are hinged together with a removable hinge pin, whereby said lower and upper brackets are readily separable from each other.

14. A mounting bracket assembly according to claim 10, wherein said upper mounting bracket comprises mounting means for mounting a computer port replicating device adjacent to said computer support surface.

15. A mounting bracket assembly according to claim 14, wherein said mounting means for mounting a computer port replicating device comprises a generally planar support surface provided at a forward end of said upper mounting bracket, and fastening means for fastening the computer port replicating device to said generally planar support surface.

16. A mounting bracket assembly according to claim 10, further comprising mounting means for mounting a DC power supply on said bracket assembly.

17. A mounting bracket assembly according to claim 16, wherein said mounting means for mounting a DC power supply comprises a vertical support surface provided on said lower mounting bracket, and fastening means for fastening said power supply to said vertical support surface.

18. A mounting bracket assembly according to claim 10, further comprising auxiliary latch means for tightly latching said upper mounting bracket to said lower bracket, whereby said upper mounting bracket can be firmly held in said computer use position.

19. A mounting bracket assembly according to claim 10, further comprising mounting means for mounting a light assembly on said bracket assembly.

20. A mounting bracket assembly according to claim 19, wherein said mounting means for mounting a light assembly comprises a second support surface of the upper mounting bracket, located adjacent to the computer support surface, and fastening means for fastening said light assembly to said second support surface.

21. A docking station for a portable computer, comprising:

a bracket assembly including attachment means for attaching said bracket assembly to a base, and a generally planar computer support surface for removably supporting a portable computer;

a computer port replicating device attached to said bracket assembly adjacent said computer support surface, said port replicating device having:
power input means for receiving power from a power supply;
at least one data input/output port; and
connector means for electrically connecting the portable computer with said power input means and said at least one data input/output port, said connector means being engageable with mating connector means provided on the portable computer, by positioning the portable computer on the computer support surface and moving the computer against said port replicating device, and disengageable from the mating connector means by moving said computer away from said port replicating device;

a DC power supply attached to said bracket assembly for providing power to said port replicating device; and an electric light assembly attached to said bracket assembly for illuminating the work area of a portable computer supported on said computer support surface.

22. A docking station according to claim 21, wherein said electric light assembly is attached to said bracket assembly adjacent said computer support surface, said light assembly comprising a lamp mounted to a free end of an elongated flexible arm, whereby said lamp is positionable overhead said computer support surface.

* * * * *